Dec. 18, 1956
A. B. SOWTER
2,774,262
BUTT PRESSURE WELDING DEVICE
Filed Aug. 15, 1952
7 Sheets-Sheet 2
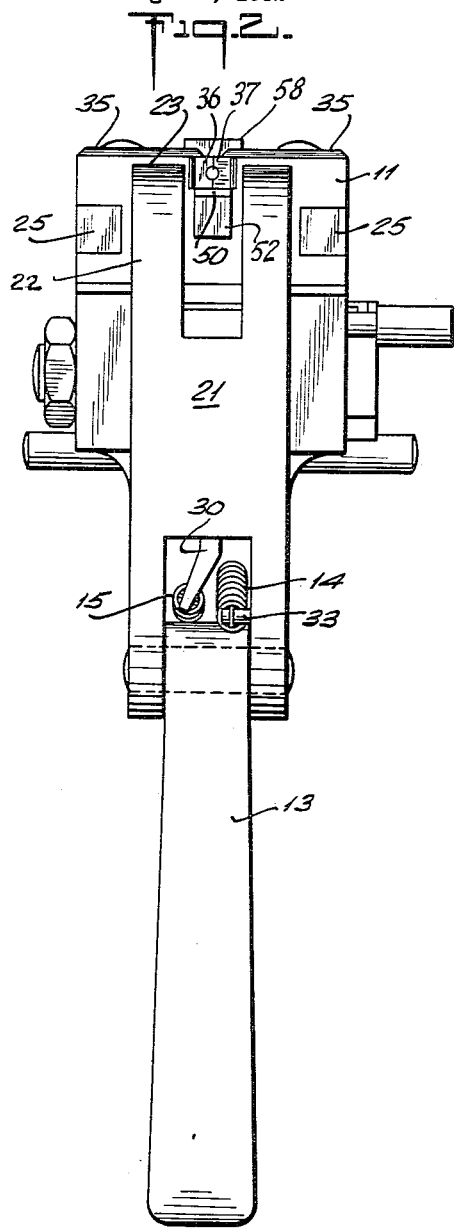
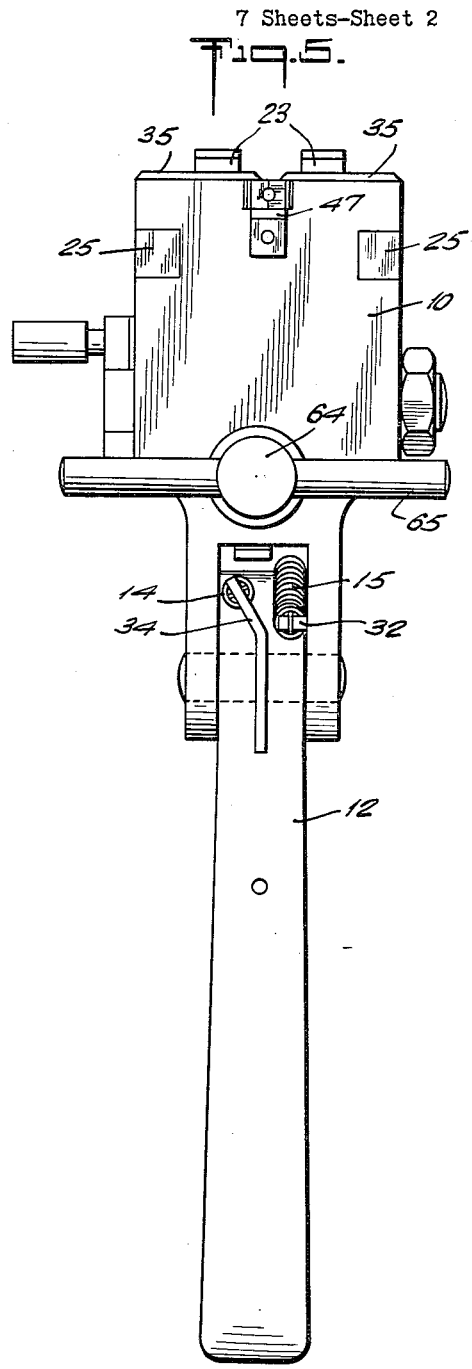
INVENTOR.
ANTHONY BAGNOLD SOWTER.
BY
ATTORNEY

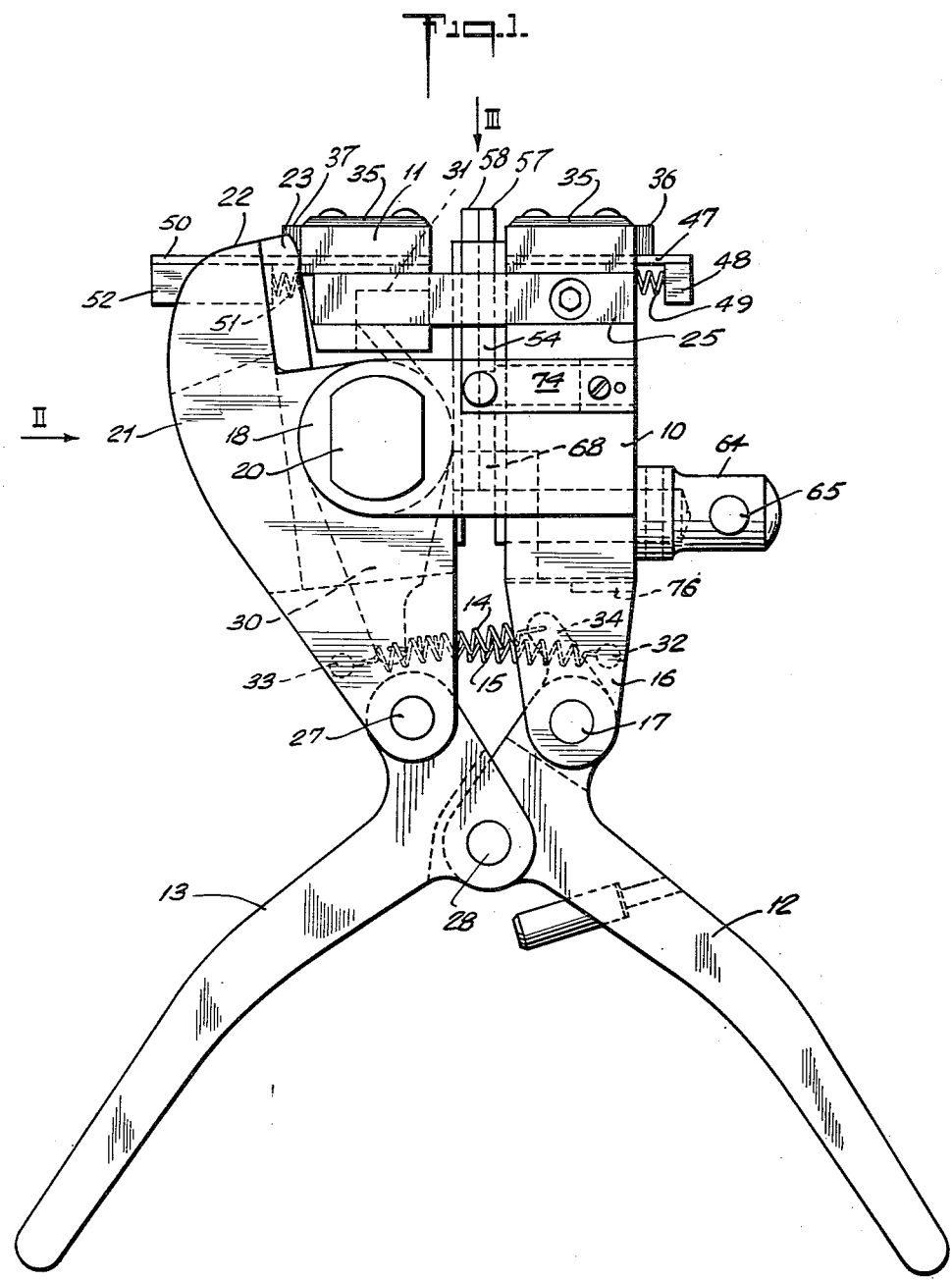

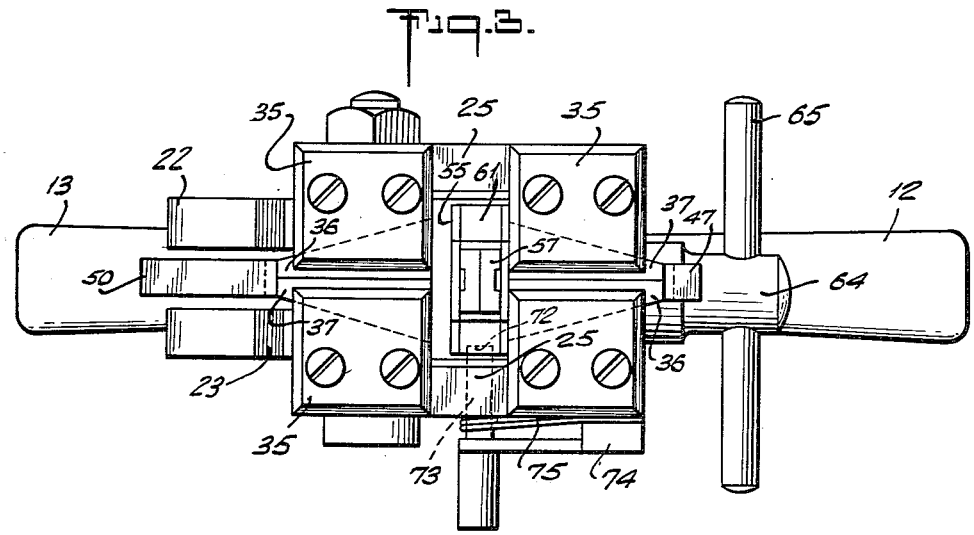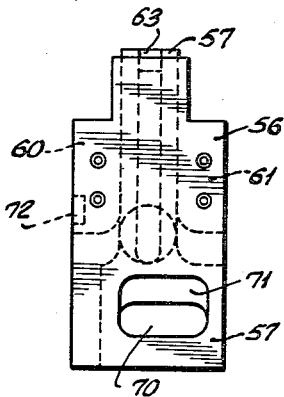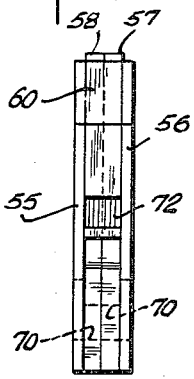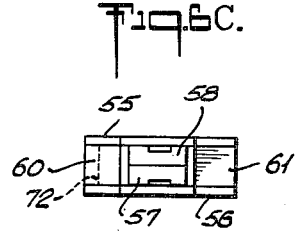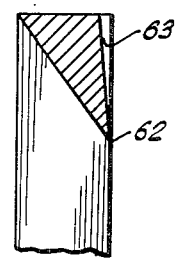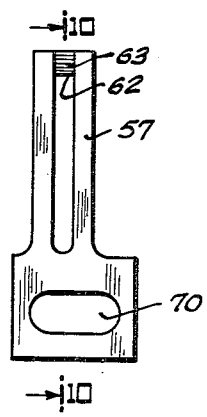

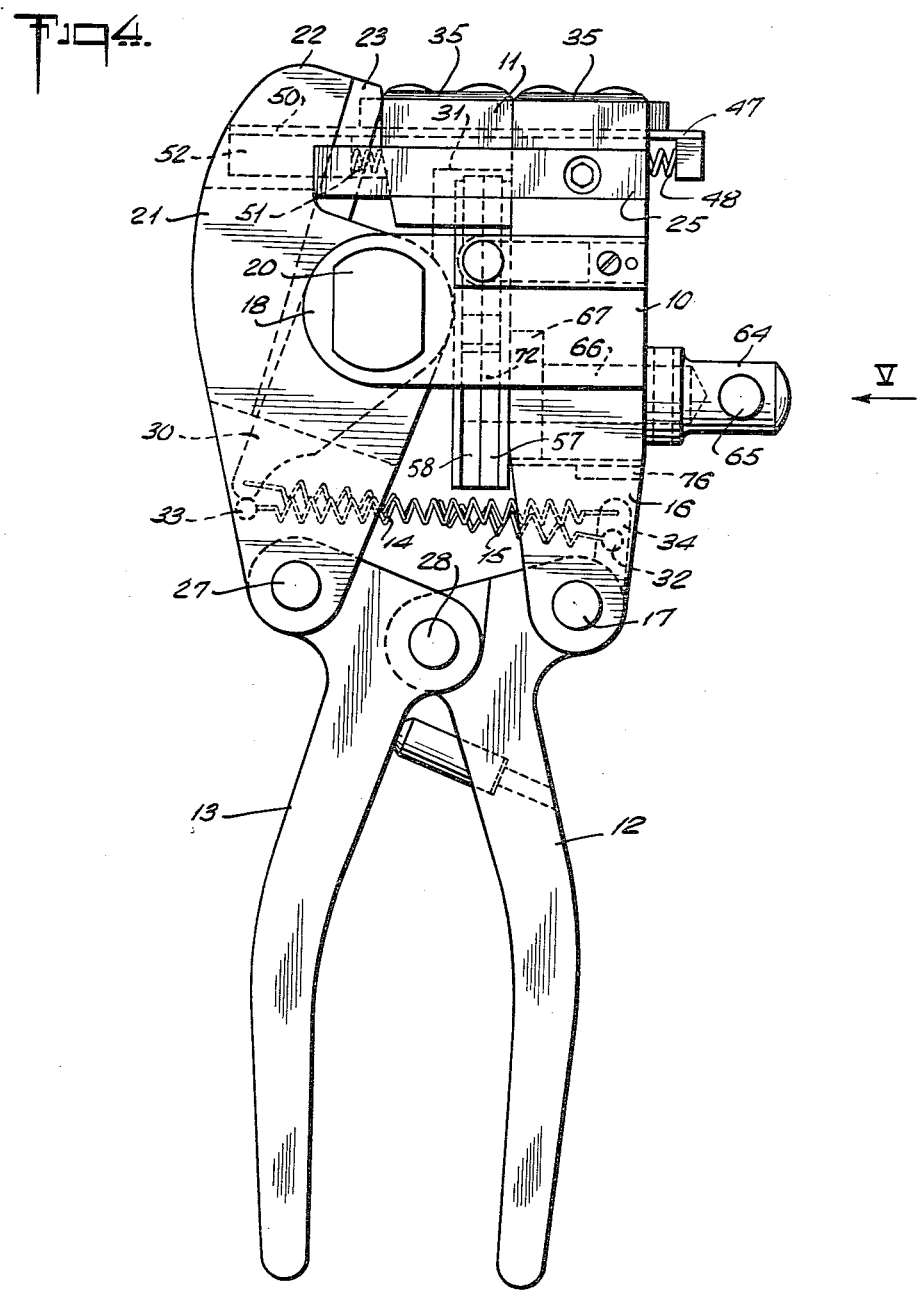

Dec. 18, 1956  A. B. SOWTER  2,774,262
BUTT PRESSURE WELDING DEVICE
Filed Aug. 15, 1952  7 Sheets-Sheet 5

INVENTOR.
ANTHONY BAGNOLD SOWTER
BY

ATTORNEY

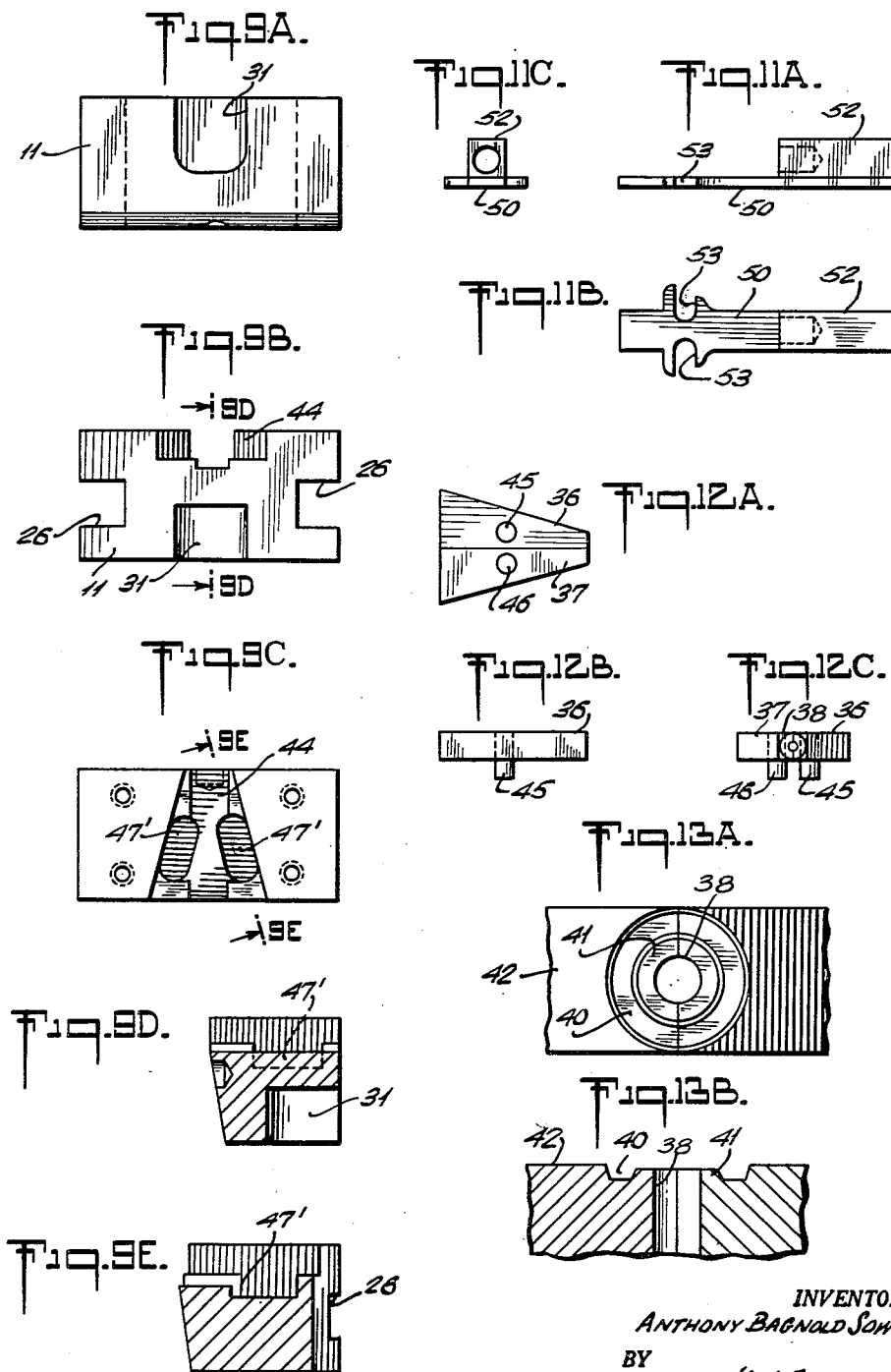

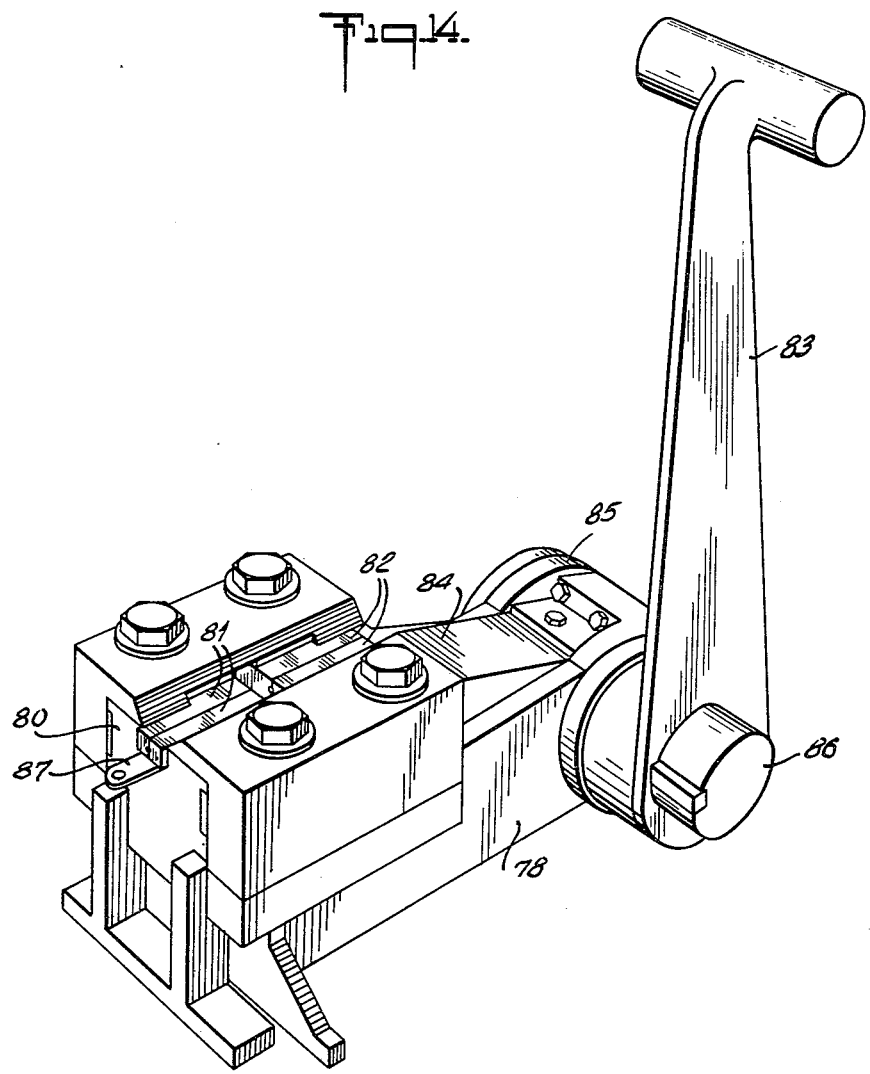

United States Patent Office 2,774,262
Patented Dec. 18, 1956

2,774,262

BUTT PRESSURE WELDING DEVICE

Anthony Bagnold Sowter, Ickenham, England, assignor to The General Electric Company Limited, London, England, a British company Application August 15, 1952, Serial No. 304,539

Claims priority, application Great Britain March 26, 1952

12 Claims. (Cl. 78—82)

The present invention relates to pressure welding, such as cold pressure welding, more particularly to the welding together by a butt joint of a pair of rods, wires, strips, plates or similar members consisting of aluminum, copper, and other cold weldable metal or alloy, substantially by pressure applied to the butted ends or surfaces of the members to be welded.

In my co-pending application, Serial No. 212,893, filed February 27, 1951, entitled Method of Pressure Welding, now Patent No. 2,698,548, granted Jan. 4, 1955, there is described a method of cold pressure welding together two members of cold weldable material in a butt joint, which method comprises holding or containing each member close to but not right up to that end which is to be jointed to the other member, in such a manner as to prevent lateral distortion of the member but to allow some lateral flow of the material of the member at the joint, and forcing the members together so that pressure is applied across the butted end surfaces of the joint through the members themselves and so that material of both members flows out laterally and, in so doing, effectively welds the members together. Tools described in the said specification for carrying out the method consist essentially of a pair of split clamping blocks arranged to be set in a press for applying the necessary welding pressure and, while satisfactory butt welds may be produced by tools generally designed in this manner, the tools shown are somewhat inconvenient for use in practice, both in a factory or in the field.

Accordingly, among the objects of the present invention is the provision of a butt welding apparatus of the basic type described in said co-pending application for cold pressure welding together the butting ends of a pair of rods, wires, strips, or the like attenuated elements of cold pressure weldable material, which is both simple in design and easy to use; which will serve both as a means for cleaning or cutting the ends of the wires prior to welding as well as for performing the welding operation; which will automatically locate and clamp the wires or the like to be welded in their proper welding position; which will firmly hold or clamp the wires or the like to prevent slipping during welding; which will enable an easy changeover from the cutting position to the welding position; and which can be adapted in the form of a simple hand or bench operated tool for use in the manufacture, assembly or repair of butt welded members of any type.

With the foregoing objects in view, a preferred cold-welding apparatus according to the invention comprises essentially a pair of holder members capable of relative rectilinear movement under the control of means for applying the welding pressure, and a set of jaws associated with each holder member each of which sets is formed with a central bore for holding a rod, wire, strip or the like attenuated elements and has a tapered external shape cooperating with a complementarily shaped aperture or bore in the associated holder member so that relative movement in the correct sense between the set of jaws and their holder members force the jaws together to effect clamping of the rod, wire, strip or the like in the jaws, the arrangement being such that the pressure for clamping the pair of rods, wires, strips or the like is obtained by movement of the holder members towards each other under the force of the means for applying the welding pressure and the length of the bore in each set of jaws and the angle of the taper of the external jaw shape being so chosen that sufficient clamping pressure is generated in a set of jaws substantially to prevent rearward flow or movement of the rod, wire, strip or the like therein before the yield point of the material thereof is reached.

The jaws of a set may be ganged together to facilitate insertion and removal of a rod, wire or strip from the set and a cutting device for suitably preparing the end of the rods, wires or strips before butt welding may be incorporated in the apparatus for operation by the same means serving to apply the welding pressure.

If the gauge of the parts to be butt welded together is relatively small, then the necessary welding pressure may be generated by a simple hand operated lever arrangement.

In order that the invention may be clearly understood, a description will now be given, with reference to the accompanying drawings, of two examples of construction of apparatus suitable for butt welding copper or aluminum wires or rods of circular section. The first construction being a hand operated tool is suitable for welding aluminum wires of about 0.064" diameter or thereabouts and less, different sizes of wires necessitating different sizes of jaws and cutting devices, while the second construction, working on the same principle as the first construction, is suitable for welding aluminum wires of up to 0.144" diameter. Since the two constructions work on the same principle, a full showing has only been made of the first, the general construction and mode of operation of the second being clear from the description of the first construction.

In the drawings:

Figure 1 shows a side view of the hand-operated butt welding tool according to the invention in its open (normal) position with a cutting device embodied in the tool in the position it occupies for feeding wires into the tool for cutting preparatory to the butt welding thereof;

Figure 2 shows an end view of the tool looking in the direction of the arrow II in Figure 1;

Figure 3 shows a top plan view of the tool looking in the direction of the arrow III in Figure 1;

Figure 4 shows a view similar to that of Figure 1, but with the cutting device lowered and the tool in its closed or welding position;

Figure 5 shows a view of the tool looking in the direction of the arrow V in Figure 4;

Figure 6A shows a side view, Figure 6B an end view, and Figure 6C a top plan view of the cutting device removed from the tool;

Figure 7 shows a side view of the right-hand cutter of the cutting device;

Figure 9A shows a side view, Figure 9B a top view, and Figure 9C a bottom plan view of a sliding block of the tool;

Figures 9D and 9E are sections taken on line 9D—9D of Figure 9B, and line 9E—9E of Figure 9C, respectively;

Figure 10 shows a part section on the line 10—10 of Figure 7, the section being enlarged to show clearly the form of the cutting device;

Figure 11A, Figure 11B and Figure 11C are three similar views of a jaw release member for the left-hand side of the tool;

Figure 8A:
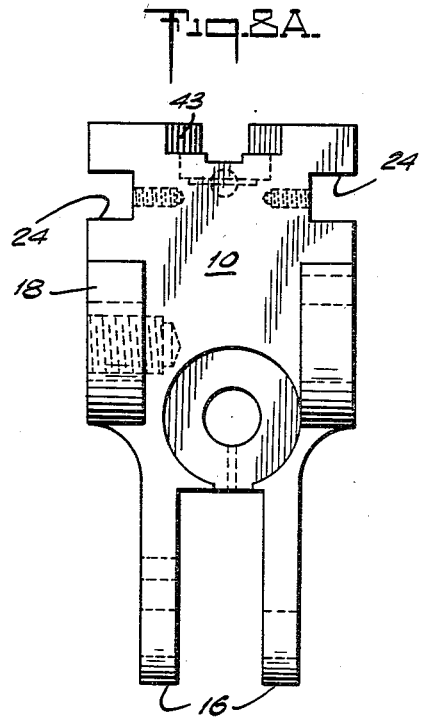
Figure 8A shows a side view, Figure 8B an end view, and Figure 8C a top plan view of a fixed block of the tool.
Figure 8B:
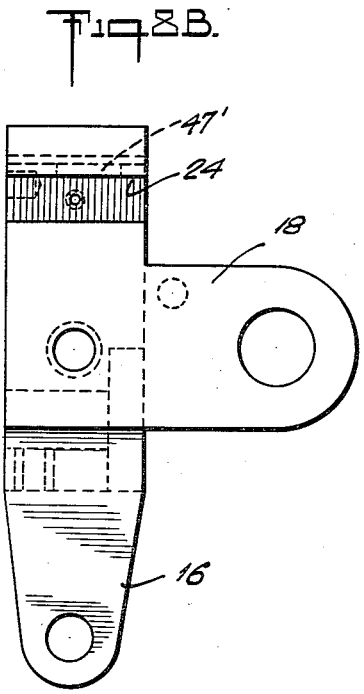
Figure 8D is a section on line 8D—8D of Figure 8C.
Figure 8C:
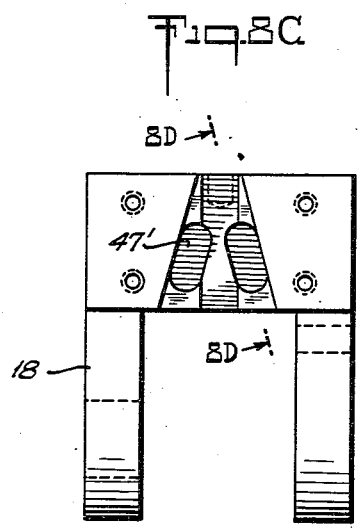
Figure 8D:
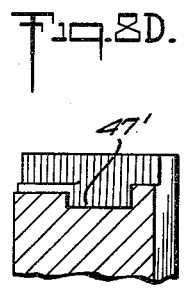

Figure 12A, Figure 12B, and Figure 12C are three similar views of one pair of jaws of the tool;

Figures 13 and 13B show front and sectional views to an enlarged scale, of the welding jaws; and Figure 14 shows a perspective view of a bench tool which does not embody a cutting device, cutting of the ends of the wires to be welded being carried out, as described in the above-mentioned copending application, before the wires are placed in the tool for welding.

Referring now to Figures 1 to 13 of the drawings, more particularly Figures 1 to 5 thereof, the welding hand tool comprises a pair of holder members which are constituted by a fixed block 10 and a sliding block 11. Each block carries a set or pair of jaws, as will be described more fully hereinafter, and the sliding block 11 is arranged to be driven towards the fixed block 10 by forcing the handles 12 and 13 together against the bias of two springs 14 and 15. The form of the fixed block 10 is shown fully in Figure 8 and referring to this figure, it will be seen that the block, which is of steel, has two depending arms 16 which carry a pivot pin 17, Figure 1, for the handle 12 and two arms 18 which extend at right angles to the arms 17 and support a thrust lever spindle 20 of a thrust lever 21. The thrust lever has a bifurcated tip 22 which carries thrust pads 23 and these thrust pads 23 bear against the sliding block 11.

Above the arms 18, the block 10 has two slots 24, Figure 8A, which carry rails 25 of square section on which the block 11 slides, the rails 25 extending in the same direction as the arms 18. Referring now to Figure 9 also, it will be seen that the sliding block 11 has slots 26 which are engaged by the rails 25 and the rails 25 insure that the relative movement between the blocks 10 and 11 is of a rectilinear kind.

The thrust lever 21 which is mounted on the spindle 20 is linked by a pivot pin 27 to the handle 13 which is also pivoted to the handle 12 at a common pivot point 28. Movement of the handles 12 and 13 together against the force of the springs 14 and 15 forces the thrust pads 23 against the sliding block 11 to force the block 11 towards the fixed block 10. In order to bias the sliding block 11 to the left-hand side (see Figure 1), a lever 30 pivoted upon the spindle 20 engages an undercut part 31 of the block 11 and is associated with the spring 15 coupled to a pin 32 on the block 10. The other spring 14 runs from a pin 33 on the thrust lever 21 to a projection 34 on the handle 12, both said springs being indicated schematically by dot-dash lines in the drawing.

Each block 10 or 11 carries a pair of sliding jaws which are retained in position by plates 35. The jaws of the two pairs are exactly similar and are shown in Figures 12 and 13. Referring to these figures, each pair of jaws comprises parts 36 and 37 which have a central bore 38 whose diameter is slightly smaller than the diameter of the wire to be welded in the hand tool. Thus, if the hand tool is desired for welding aluminum wires of 0.064" diameter, then the bore 38 would be about 0.062" diameter. The bore 38 may be roughened. As is shown more clearly in Figures 13A and 13B representing an enlarged view of and section through the welding face of a pair of jaws, the latter are provided with an annular groove 40 which is disposed around the mouth of the bore 38. The shoulder 41 formed by the groove 40 lies slightly below the face 42 of the pair of jaws and this is to allow metal to flow radially outwards during the welding process.

The pairs of jaws lie in tapered recesses 43 and 44, respectively, Figures 8A and 9B, in the blocks 10 and 11 and the parts 36 and 37 of a pair of jaws each carry on their undersides a depending pin 45 or 46 engaging one of the pair of slots 47' in the recesses 43 and 44. The lines of the slots 47' are parallel to the sides of the recesses 43 and 44 so that the pairs of jaws move rectilinearly in the recesses 43 and 44. Each pair of jaws has its parts 36 and 37 ganged together by a jaw release lever, the release lever 47, Figure 1, associated with the right-hand pair of jaws and being provided with an operating member 48 and a return spring 49, whilst the jaw release lever 50 associated with the left-hand pair of jaws is provided with a return spring 51. The jaw release lever 50 associated with the left-hand pair of jaws is shown in detail in Figure 11 and comprises a flat plate and an operating member 52 and two slots 53 which engage with the pins 45 and 46 on the parts 36 and 37 of a pair of jaws.

As will be appreciated from the drawings, pressure upon a jaw release lever 47 or 50 to force it inwardly against the action of the springs 48 and 51, respectively, normally urging the two sets of jaws into engaging or closed position, will cause the two parts 36 and 37 of the associated pair of jaws to move towards the central plane of the blocks 10 and 11, thus separating the jaws one from another.

When a wire is placed between the two parts 36 and 37 of a pair of jaws and the jaws are forced backwardly in the tapered slot 43 or 44 of a block 10 or 11 upon release of the levers 47 and 50, the jaws come together to clamp the wire solidly between them and prevent rearward movement or flow of the wire during the welding process. The length of the bore 38 and the angle of taper of the slots 43 and 44 are so chosen that sufficient clamping pressure is generated to prevent the rearward flow of metal and to insure that the pressure generated at the welding faces is used substantially only for producing radial flow of the metal for welding as is described in greater detail in the above-mentioned application. The wire in a pair of jaws must be loaded by a clamping pressure which is at least equal to that pressure at which the material of the wire begins to flow radially at the weld.

As will be appreciated from the above description, the bores 38 in the two pairs of jaws are in line so that wires set in each pair of jaws can be butted together for welding when the handles 12 and 13 are squeezed together. Once the wires have been welded, the handles 12 and 13 can be released and the butt welded wires released from the pairs of jaws by operation of the two jaw release levers 47 and 50.

Before welding, it is essential to set the projecting lengths and to clear the facing ends of the wires and for this purpose the cutting device is included. This is generally indicated by the reference 54 in Figure 1 and the sub-assembly of the cutting device is shown in detail in Figures 6 and 7, to which reference is now made.

The cutting device, Figure 6, comprises a pair of side plates 55 and 56 which are pinned together by rivets and hold between them two cutting blades 57 and 58. The distance between the side plates 55 and 56 is set by two spacers 60 and 61 and the form of the right-hand cutter blade 57 is shown clearly in Figure 7. The cutter blades 57 and 58 can slide between the plates 55 and 56, being guided by the spacers 60 and 61, and relative movement of the blades with regard to the plates 55 and 56 is arranged to cut the ends of the wires true and thereby to insure a clean end for welding.

As will be seen in Figure 10, which shows an enlarged view of the right hand cutter blade 57, the blade is provided with a cutting edge 62 and in order that during cutting the blade shall not be dragged across the face of the wire, the cutting blade is cut away by a small amount at the face 63. As will be seen from Figure 6, the cutting edge 62 lies across the central plane of the cutting device, which plane lies on the axis of the bores 38 in the two pairs of jaws, and the top of each of the side plates 55 and 56 of the cutting device 54 is provided with a semicircular groove 63 in which the end of the adjacent wire lies when being severed by the cutting blade.

The cutting device 54 is raised and lowered by an eccentric device operated by a knob 64, Figure 1, having a tommy bar 65, the device having a spindle 66 mounted in the block 10 and carrying a disc 67 having an eccentric pin 68 moving in slots 70 in the cutting blades 57 and 58 and slots 71 in the side plates 55 and 56.

As will be seen from Figure 6, the height of the slots 70 is only about half that of the slot 71 and the difference in the height of the slots allows the cutting blades 57 and 58 to be raised higher than the side plates 55 and 56 by the eccentric pin 68. When the cutting blades are pushed downwardly with the ends of the wires beneath the blades and in the grooves 63, the ends of the wires are cut off flat and perpendicular to the axis of the bores 38 in the pairs of jaws. In order to hold the side plates 55 and 56 while the cutting blades 57 and 58 are being moved relatively to the side plates, a recess 72 is provided in the spacer 60 and this recess is engaged by the tip of a plunger 73, Figure 3, mounted on a holder 74. A spring 75 biases the plunger 73 outwardly and away from the recess 72 in the spacer 60. The action of the spring may be reversed. A friction spring 76, Figure 1, bears on the eccentric spindle 66 to prevent the cutting device dropping freely under gravity.

In order to operate the hand tool with the handles 12 and 13 in their normal position as shown in Figure 1, the cutting device 54 is raised by rotating the knob 64 by the tommy bar 65. The cutting device is raised by anti-clockwise rotation of the knob and until the recess 72 in the spacer 60 can be engaged by the plunger 73. The plunger 73 is engaged and by continued rotation of the knob 64, the cutter blades 57 and 58 are raised in the manner shown in Figure 1. The plunger 73 is released but due to the presence of the spring 76, the cutting device remains in its position and the wires to be welded are inserted in the pairs of jaws of the tool.

To facilitate the insertion of the wires, the jaw release levers 47 and 50 can be operated inwardly and the right-hand wire is fed in until at least it passes the cutting edge of the associated cutting blade 57. The left-hand wire will be fed in and project from its pair of jaws by about the same amount.

The height of the cutting device 54 may need some slight adjustment to facilitate the entry of the right-hand wire into the device since the end may be slightly bent. The cutting device 54 is then set at its correct height by engaging the plunger 73 in the recess 72 and the handles 12 and 13 are moved together to bring the sliding block 11 up to the cutting device so that the left-hand wire also passes beneath and beyond the cutting edge of its associated cutting blade 58. The handles 12 and 13 are pressed together to force the jaws against the cutting device so effecting firm clamping of the wires and then the knob 64 is turned in a clockwise direction to trim off the ends of the wires. The required projecting lengths of the wires from the jaws is set by the thickness of the plates 55 and 56. The plunger 73 is then released and the knob 64 is rotated still further to bring the cutting device 54 to its lowest position, the handles 12 and 13 being suitably slackened off. The handles 12 and 13 are then brought quickly and firmly to their innermost positions to force the sliding block 11 up against the block 10 and so make the butt weld between the clean ends of the two wires. Upon releasing the handles 12 and 13, the pull on the joint releases the taper and for removal of the wires, the jaw release levers 49 and 50 are pressed inwardly to release the wires fully; the wires can then be removed from the tool by lifting them out through the gaps between the jaws which are now open. The form of the weld follows the form of the exits of the bores 38 in the jaws and the flash of metal at the weld can be trimmed off if necessary.

As will be appreciated, the tool as described above is of a portable nature and is ideally suited for making welds in aluminum wire either in a factory or in the field. No special cleaning techniques separate from the tool are required and if it is to be used in a factory, it can be mounted upon a support pedestal stand bolted to one of the arms 18 of the block 10. Generally, it would be mounted on a stand with its plane slightly inclined to the vertical with the stand bolted to that arm 18 in Figure 1 to the rearward of the figure.

For welding aluminum wires of a larger diameter than those suitable for welding in the tool described above, the tool shown in Figure 14 may be used and, as in the previous construction, the tool has two pairs of jaws which are arranged to be driven towards one another to effect welding. Referring now to Figure 14, the tool is suitable for mounting on a bench and comprises a base 78 having a fixed block 80 for a pair of jaws 81 and the second pair of jaws 82 are arranged to be driven towards the jaws 81 by a hand lever 83 operating through a connecting rod 84. The connecting rod 84 is mounted on an eccentric 85 on the shaft 86 for the lever 83 and the arrangement is such that the required pressure is generated at the weld by operation of the lever 83. As before, the jaws 81 and 82 are ganged together in their pairs, and jaw release levers, one of which 87 is shown, are provided.

In the foregoing the invention has been described with specific reference to an illustrative device. It will be evident, however, that numerous modifications and variations as well as the substitution of equivalent elements for those shown and described for illustration, may be made without departing from the broader scope and spirit of the invention as defined in the appended claims. The specification and drawings are, accordingly, to be regarded in an illustrative rather than in a limiting sense.

What I claim is:

1. Pressure welding apparatus for butt joining a pair of wires or the like of pressure weldable metal comprising a pair of holder members arranged for relative rectilinear movement and normally biased away from each other, welding pressure applying means for moving said members together, pairs of cooperating jaw plates associated with each holder member, each pair of jaw plates being formed with a central bore having a diameter slightly less than the diameter of the wires to be joined and having tapering outer contours engaging a correspondingly shaped tapering recess in the associated holder member, whereby to force the cooperating jaw plates together and to firmly clamp the wires held in the bores thereof by the welding pressure applied to the butted ends of the wires through said holder members, resilient means normally urging the cooperating jaw plates into engaged position, and means for temporarily disengaging the cooperating jaw plates comprising a pair of pins depending from each jaw plate and arranged to cam with a slot in the recess of the associated holder member, said slot being parallel to the contour of said jaw plates, and operating means camming with said pins for simultaneously displacing and disengaging the cooperating jaw plates.

2. In apparatus as claimed in claim 1, said last means comprising a sliding plate interposed between said jaw plates and the adjoining recess, said plate having a pair of transverse slots each arranged to cam with one of said pins.

3. Pressure welding apparatus for butt joining a pair of wires or the like of pressure weldable metal comprising a pair of holder members arranged for relative rectilinear movement and normally biased away from each other, welding pressure applying means for moving said members together, pairs of cooperating jaw plates associated with each holder member, each pair of jaw plates being formed with a central bore having a diameter slightly less than the diameter of the wires to be joined and having tapering outer contours engaging a correspondingly shaped tapering recess in the associated holder member, whereby to force the cooperating jaw plates together and to firmly clamp the wires held in the bores thereof by the welding pressure applied to the butted ends of said wires through said holder members, means for temporarily disengaging the cooperating jaw plates comprising a pin depending from each jaw plate and arranged to cam with a slot in the recess of the associated holder member, said slot being parallel to the contour of said jaw members, a sliding plate interposed between said jaw plates and the adjacent recess, said sliding plate having a pair of transverse slots each engaging one of said pins, and resilient means normally urging said sliding plate to a position to maintain said jaw plates in engaged position, and operating means for said sliding plate for temporarily disengaging said jaw plates.

4. Pressure welding apparatus for butt joining a pair of wires or the like of pressure weldable metal comprising a first relatively fixed holder member provided with guide means, a second relatively movable holder member having a recess engaging said guide means, to enable relative rectilinear movement between said members, welding pressure applying means for moving said members together comprising a pair of handle arms having ends pivoted together, a thrust lever centrally pivotally mounted upon said first member and having one end engaging the other member, further pivot connections of both of said arms near the pivoted ends thereof with said first member and with the opposite end of said thrust lever, respectively, sets of cooperating jaw plates being formed with a central bore having a diameter slightly less than the diameter of the wires to be joined, said jaw plates having tapering contours engaging a correspondingly shaped tapering recess in the associated holder member, whereby to force said jaw plates together and to firmly clamp the wires held in the bores thereof by the welding pressure applied to the butted ends of the wires through said holder members.

5. In apparatus as claimed in claim 4, including first spring means normally urging said second member away from said first member, and further spring means normally urging apart said handle arms.

6. Pressure welding apparatus for butt joining a pair of wires or the like of pressure weldable metal comprising a support, a first holder member fixedly mounted upon said support, a second holder member slidably mounted upon said support for relative operation of said members within a rectilinear work cycle path, welding pressure applying operating means for said members comprising a pair of handle arms having ends pivoted together, a thrust lever centrally pivotally mounted upon said support and having one end camming with said second member, further pivot connections of both of said arms near the pivoted ends thereof with said support and with the opposite end of said thrust lever, respectively, sets of jaws, the jaws of each set cooperating to form a gripping bore having a cross-sectional dimension slightly less than the cross-sectional dimension of the wires or the like to be joined and each set of jaws having tapering contours engaging a correspondingly shaped tapering cavity in one of said holder members, whereby to force the jaws of each set together and to firmly clamp the wires or the like held in the bores thereof by welding pressure applied to the butted ends of said wires or the like through said holder members.

7. A pressure welding tool for butt welding a pair of wires, strips and the like of pressure weldable metal comprising a support, a pair of holder members having end surfaces and mounted for relative rectilinear sliding movement upon said support, drive means for operating said holder members through a work cycle path towards and away from each other, gripping means on each holder member, said gripping means being in axial alignment for holding and clamping a pair of wires or the like by said holder members with their ends to be joined in line and projecting from the end surfaces of said members, for applying welding pressure to the butted ends of the wires or the like by said drive means, a trimming device mounted upon said support and having operating means to move the same into and out of operative position between said holder members, said trimming device comprising a first spacer member having a surface to locate the end surface of one of said holder members into a predetermined relative seated position therewith by operation of said drive means, a second spacer member having a surface to locate the end surface of the other holder member into a predetermined relative seated position therewith by operation of said drive means, a first cutting member in relative sliding engagement with said first spacer member and thereby operative at a fixed distance from the end surface of one of said holder members, a second cutting member in relative sliding engagement with said second spacer member and thereby operative at a fixed distance from the end surface of the other of said holder members, whereby the wires or the like held in said holder members and projecting beyond the adjacent spacer members may be cut and trimmed by said cutting members to predetermined projecting lengths from the end surfaces of their respective holder members preparatory to welding.

8. In a welding tool as claimed in claim 7, said operating means for said trimming device comprising cooperating camming surface and eccentric means on said support and trimming device arranged for successive engagement, whereby to first move said trimming device into operative position between said holder members by initial actuation of said operating means and thereafter to move said cutting members into relative cutting position with said spacer members by continued actuation of said operating means.

9. A pressure welding tool for butt welding a pair of wires, strips and the like of pressure weldable metal comprising a support, a pair of holder members mounted for relative rectilinear sliding movement upon said support, drive means for operating said holder members through a work cycle towards and away from each other, first split tapered die means seated in a corresponding tapered cavity of one of said holder members, second split tapered die means seated in a corresponding tapered cavity of the holder member, each said split die means having a central bore adapted to grip a wire or the like as the die is pressed into its respective cavity and each die means having an end surface at its forward end, a trimming device mounted upon said support and having operating means to move the same into and out of operative position between said holder members, said trimming device comprising a first spacer member having a surface to locate the end surface of one of said split die means into a predetermined relative seated position therewith by operation of said drive means, a second spacer member having a surface to locate the end surface of the other split die means into a predetermined relative seated position therewith by operation of said drive means, a first cutting member in relative sliding engagement with said first spacer member and thereby operative at a fixed distance from the end surface of one of said die means, a second cutting member in relative sliding engagement with said second spacer member and thereby operative at a fixed distance from the end surface of the other of said die means, whereby the wires or the like held in said holder members and projecting beyond the adjacent spacer members may be cut and trimmed by said cutting members to predetermined projecting lengths from the end surfaces of their respective die means preparatory to welding.

10. In a pressure welding tool as claimed in claim 9, including resilient means to normally urge the jaws of each of said split die means into engaged position, and control means carried by said holder members for temporarily spreading the jaws of each die means by movement along the cavity of its holder member, for insertion of the members to be welded in said die means prior to and removal therefrom upon welding.

11. Means for cold butt welding the ends of attenuated elements comprising supporting means, opposed welding heads mounted on said supporting means for relative movement toward and away from each other, each said welding heads having means for gripping an attenuated element with a length projecting therefrom, the elements so gripped having their lengths projecting towards each other in alignment, means for relatively moving said welding heads toward each other, retractible means stopping the relative movement of said heads toward each other at a set spacing, and cutting means moving centrally of said set spacing to cut off the ends of said projecting lengths to determine a critical length projecting from each welding head, whereby said retractible means may be retracted and said heads brought further together to butt weld the ends of said projecting lengths.

12. Means for cold butt welding the ends of attenuated elements comprising, supporting means, opposed welding heads mounted on said supoprting means for relative movement toward and away from each other, each said welding heads having means for gripping an attenuated element with a length projecting therefrom, the elements so gripped having their lengths projecting towards each other in alignment, means for relatively moving said welding heads toward and away from each other, retractible means determining a set thickness, means mounting said retractible means on said supporting means for movement to and from a location in between said welding heads to determine a set spacing thereof as movement of said heads toward each other is stopped in accordance with said set thickness, cutting means, and means mounting said cutting means for movement in a path centrally of said spacing to cut off the ends of said projecting lengths to thereby provide a critical length to said lengths projecting, whereby said retractible means and cutting means may be retracted and said welding heads brought further together to butt weld the ends of said elements.

References Cited in the file of this patent

UNITED STATES PATENTS

| | | |
|---|---|---|
| 647,469 | Brown et al. | Apr. 17, 1900 |
| 731,100 | Dick | June 16, 1903 |
| 812,803 | Arey | Feb. 20, 1906 |
| 918,745 | Goldschmidt et al. | Apr. 20, 1909 |
| 2,062,986 | Baxter | Dec. 1, 1936 |
| 2,228,746 | Berkebil | Jan. 14, 1941 |